United States Patent
Park et al.

(10) Patent No.: US 11,027,668 B2
(45) Date of Patent: Jun. 8, 2021

(54) CAMERA MONITORING SYSTEM

(71) Applicants: HYUNDAI MOTOR COMPANY, Seoul (KR); KIA MOTORS CORPORATION, Seoul (KR); AMOTECH CO., LTD., Incheon (KR); Hyundai Mobis Co., Ltd., Seoul (KR)

(72) Inventors: Jong Min Park, Hwaseong-si (KR); Jong Uk Kim, Bucheon-si (KR); Geon Pyo Kim, Seoul (KR)

(73) Assignees: HYUNDAI MOTOR COMPANY, Seoul (KR); KIA MOTORS CORPORATION, Seoul (KR); AMOTECH CO., LTD., Incheon (KR); HYUNDAI MOBIS CO., LTD., Seoul (KR)

( * ) Notice: Subject to any disclaimer, the term of this patent is extended or adjusted under 35 U.S.C. 154(b) by 55 days.

(21) Appl. No.: 16/454,575

(22) Filed: Jun. 27, 2019

(65) Prior Publication Data

US 2020/0156558 A1     May 21, 2020

(30) Foreign Application Priority Data

Nov. 20, 2018   (KR) .......................... 10-2018-0143084

(51) Int. Cl.
*B60R 11/04* (2006.01)
*G03B 17/56* (2021.01)
(Continued)

(52) U.S. Cl.
CPC .................. *B60R 11/04* (2013.01); *B60S 1/52* (2013.01); *B60S 1/54* (2013.01); *G02B 27/0006* (2013.01);
(Continued)

(58) Field of Classification Search
CPC ............... B60R 11/04; B60R 2300/804; B60R 2300/806; B60R 2300/8066; B60R 2011/004
See application file for complete search history.

(56) References Cited

U.S. PATENT DOCUMENTS 9,725,049 B2 *   8/2017   Buschmann .............. B60R 1/00
2003/0103142 A1 *   6/2003   Hitomi .................... B60R 11/04
348/148

(Continued)

FOREIGN PATENT DOCUMENTS

KR   10-2007-0063485 A   6/2007

*Primary Examiner* — Noam Reisner
(74) *Attorney, Agent, or Firm* — Brinks Gilson & Lione

(57) ABSTRACT

A camera monitoring system includes: a housing rotatable around a coupling shaft of a base part disposed in a vehicle; a camera disposed on one end of the housing; a cam plate disposed inside the housing and fixed to the base part; a link including a first end moving along a guide part of the cam plate and a second end to rotate the camera when the housing rotates; a driving part for applying a driving force to rotate the housing; and a control part to determine a folded state of the housing by controlling the driving force applied from the driving part based on a vehicle speed, and to rotate the camera simultaneously with the housing based on the folded state of the housing so as to maintain a previously set angle of a camera view.

9 Claims, 10 Drawing Sheets

(51) Int. Cl.
  *G02B 27/00* (2006.01)
  *B60S 1/52* (2006.01)
  *B60S 1/54* (2006.01)
  *B60R 1/00* (2006.01)
  *B60R 11/00* (2006.01)

(52) U.S. Cl.
  CPC .............. *G03B 17/561* (2013.01); *B60R 1/00* (2013.01); *B60R 2011/0043* (2013.01); *B60R 2011/0085* (2013.01); *B60R 2011/0092* (2013.01)

(56) References Cited

U.S. PATENT DOCUMENTS

| | | | |
|---|---|---|---|
| 2012/0007984 A1* | 1/2012 | Schutz | B60R 11/04 348/148 |
| 2015/0151722 A1* | 6/2015 | Gokan | B60S 1/0848 134/102.2 |
| 2019/0118728 A1* | 4/2019 | Oba | H04N 5/247 |

* cited by examiner

FIG. 1 "PRIOR ART"

EXTERIOR MODULE ANGLE : 12°
CAMERA ANGLE : 18°

EXTERIOR MODULE ANGLE : 40°
CAMERA ANGLE : 18°

EXTERIOR MODULE ANGLE : 80°
CAMERA ANGLE : -151°

CAMERA MONITORING SYSTEM

CROSS-REFERENCE TO RELATED APPLICATION

This application claims priority to and the benefit of Korean Patent Application No. 10-2018-0143084, filed on Nov. 20, 2018, the entire contents of which are incorporated herein by reference.

FIELD

The present disclosure relates to a camera monitoring system for reducing an air resistance.

BACKGROUND

The statements in this section merely provide background information related to the present disclosure and may not constitute prior art.

Generally, when a vehicle changes lanes, a driver of the vehicle relies on a room mirror installed in an indoor central front thereof and a side mirror, and at this time, there is a problem in that a driver watches the side mirror in the traveling direction and, there is a risk of an accident with another vehicle traveling at a blind spot or with a front vehicle traveling ahead.

In addition, when a vehicle is parked or stopped, a conventional side mirror is configured to be folded in a state protruded to the outside and thereby, is damaged by a physical impact on the side mirror.

Therefore, recently, a Camera Monitoring System (CMS) has been introduced, which is configured to display an external situation of the vehicle on a screen through an exterior camera lens.

As described above, the vehicle incorporating the CMS system is configured to photograph the external situation of the vehicle through an exterior camera protruded to the outside of the vehicle, and to display the image photographed by the exterior camera on a display part disposed inside the vehicle.

FIG. 1 is a diagram illustrating a configuration of an exterior camera rotated and protruded on the outside surface of the vehicle as the related art.

As illustrated, FIG. 1 includes an exterior camera 20 disposed at one side of a door 11 of the vehicle, and the exterior camera is configured to include a first lens 30 and a second lens 31 to be rotatable toward the inside of the door.

However, we have discovered that the exterior camera configured to be inserted into and protruded from the door has the small protrusion amount of the exterior camera, such that it was somewhat difficult to observe all of the side and rear views of the vehicle.

In addition, we have also found that there is an aerodynamic loss of the vehicle due to the CMS including a protrusion part regardless of a vehicle speed.

The above information disclosed in this Background section is only for enhancement of understanding of the background of the disclosure and accordingly it may contain information that does not form the prior art that is already known to a person of ordinary skill in the art.

SUMMARY

The present disclosure provides a camera monitoring system configured so that a housing and a camera simultaneously rotate according to a vehicle speed to provide the same screen to a driver, and to reduce the flow resistance generated by the protruded housing.

The present disclosure provides the housing capable of bidirectional rotation, such that another form of the present disclosure is to provide a system, which prevents breakage when an impact has been applied to a protruded camera monitoring system in the direction opposite to the folding direction thereof.

In another form of the present disclosure, a camera monitoring system performs rotation of a camera together with rotation of the housing through a single driving part.

The present disclosure are not limited to the above-mentioned exemplary form, and other forms that are not mentioned may be understood by the following description and may be more clearly understood by the forms of the present disclosure.

The camera monitoring system in exemplary forms of the present disclosure may include the following configuration.

A camera monitoring system of the present disclosure provides a camera monitoring system including: a housing configured to rotate around a coupling shaft of a base part disposed in a vehicle; a camera disposed on one end of the housing; a cam plate disposed inside the housing, and fixed to the base part; a link including a first end configured to move along a guide part of the cam plate, and a second end configured to rotate the camera when the housing rotates; a driving part configured to apply a driving force so that the housing rotates; and a control part configured to determine a folded state of the housing by controlling the driving force applied from the driving part based on a vehicle speed, and to rotate the camera simultaneously with the housing based on the folded state of the housing so as to maintain a previously set angle of a camera view.

In addition, the present disclosure provides the camera monitoring system in which the guide part disposed on the cam plate includes a first guide part configured so that the camera is rotated based on a rotation amount of the housing; and a second guide part configured so that a camera lens rotates and moves into the housing when the housing has been folded.

In addition, the present disclosure provides the camera monitoring system in which the link is configured so that a length from the coupling shaft to the first end of the link varies when moving along the guide part.

In addition, the present disclosure provides the camera monitoring system in which the link is configured to slidably move along a groove disposed on a case configured to surround the driving part.

In addition, the present disclosure provides the camera monitoring system in which at least a part of the housing facing a driver is configured to include a mirror part.

In addition, the present disclosure provides the camera monitoring system in which the control part is configured to control the rotation amount of the housing based on the vehicle speed, and to rotate the camera in order to maintain the previously set angle of the camera view based on the rotation amount of the housing.

In addition, the present disclosure provides the camera monitoring system further including an air injection nozzle and a washer fluid nozzle disposed adjacent to a camera lens.

In addition, the present disclosure provides the camera monitoring system in which the air injection nozzle is fluidly connected to an air compression pump, and the washer fluid nozzle is fluidly connected to a washer fluid pump so that the injected amounts of air and washer fluid are controlled by the control part.

In addition, the present disclosure provides the camera monitoring system further including a rotating hinge part configured at a position facing the housing on the base part so that the housing and the cam plate are rotatable in a reverse direction thereof.

In addition, the present disclosure provides the camera monitoring system in which the cam plate is fixed independently of a forward rotation of the housing.

The present disclosure may obtain the following effects by the above-described forms, and configuration, coupling, and usage relationship thereof, which will be described below.

The present disclosure provides a structure in which the housing is folded to be adjacent to the vehicle body at a vehicle speed equal to or greater than a predetermined value, thereby improving aerodynamic performance of the vehicle.

In addition, the present disclosure is configured so that the camera lens rotates and moves into the housing in a state where the housing has been fully folded, thereby preventing damage to the camera lens.

Other aspects and exemplary forms of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
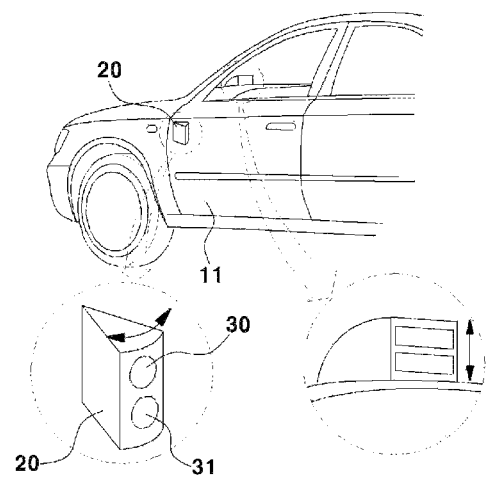
FIG. 1 is a diagram illustrating a camera monitoring system, as the related art.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in more detail with reference to the accompanying drawings. The forms of the present disclosure may be modified in various forms, and the scope of the present disclosure should not be construed as being limited to the following forms. This form is provided to more fully explain the present disclosure to those skilled in the art.

In addition, the term " . . . part", and the like described in the specification mean a unit for processing at least one function or operation, and this may be implemented by hardware or software or a combination of hardware and software.

In addition, in the present specification, the name of the configuration is divided into the first, the second, and the like in order to distinguish the names of the configurations from each other in the same relationship, and is not necessarily limited to the order in the following description.

In addition, in the present specification, a 'forward direction' as a rotation direction of the configuration means that a housing or a configuration of a system rotates toward the rear of a vehicle by a driving force, and a 'reverse direction' thereof means to rotate toward the front of the vehicle.

In addition, a camera monitoring system 100 disclosed in the present specification is configured to be symmetric to each other on both side surfaces base on the vehicle, such that the configuration disclosed below is described for the camera monitoring system 100 disposed on one side surface thereof.

In addition, in the present specification, the term 'folded state' includes a fully opened state, a partially folded state, and a fully folded state.

Figure 2:
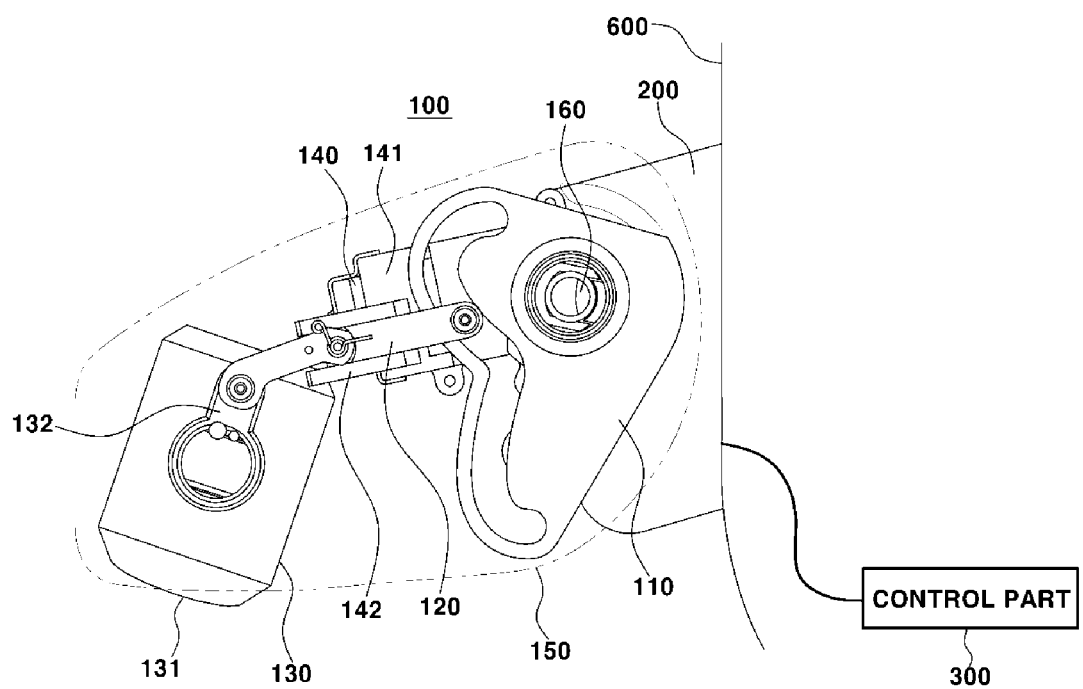
FIG. 2 is a diagram illustrating a configuration of a camera monitoring system.

FIG. 2 is a diagram illustrating a configuration of a camera monitoring system 100, as one form of the present disclosure.

As illustrated, a camera monitoring system 100 includes a base part 200 interposed between a vehicle body 600 and a housing, and includes the housing configured to be rotatable around a coupling shaft 160 of the base part 200.

The inside of the housing includes a cam plate 110 disposed to surround the coupling shaft 160, and includes a link 120 configured to have one end moving along a guide part 111 of the cam plate 110 and to have the other end connected to a camera.

At least a part of the outside of the housing includes a mirror part 150 for performing the fail-safe function of the camera monitoring system 100, such that it includes a configuration in which a driver may directly secure the side surface view of the vehicle.

In one form, the camera monitoring system 100 of the present disclosure is configured to provide the side surface image of the vehicle, which is photographed through a camera 130, through a display part (not illustrated) disposed inside the vehicle.

The link 120 is configured to be movable along the guide part 111, and may be configured so that a distance from one end of the link 120 to the coupling shaft 160 varies. In addition, the camera monitoring system 100 includes a driving part 140 disposed on the lower surfaces of the cam plate 110 and the link 120 to apply a driving force so that the camera monitoring system 100 is rotatable, and a control part 300 disposed inside the vehicle in order to control the rotation amount of the camera monitoring system 100 by the driving part 140.

The control part 300 is configured to control the driving force applied from the driving part 140 to the camera monitoring system 100 according to a vehicle speed. That is, the control part 300 controls the driving force applied from the driving part 140 to move in a state where the camera monitoring system 100 is fully opened upon vehicle traveling, and performs a control so that the camera monitoring system 100 and the camera are simultaneously switched to the partially folded state at a predetermined speed or more of a vehicle speed.

In addition, when recognizing that the vehicle is in a stopped state or in a turn-off state, the control part 300 receives a driving force from the driving part 140 so that the camera monitoring system 100 is switched to the fully folded state (folding state).

Figure 3A:
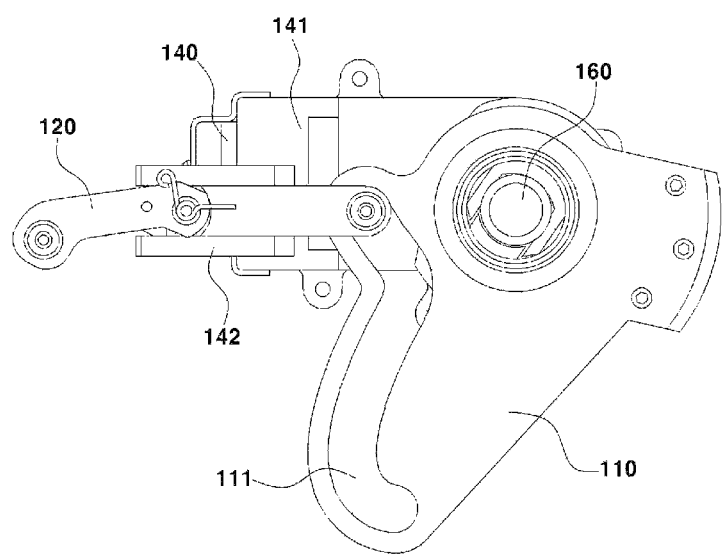
FIG. 3A is a diagram illustrating a configuration of the inside of a housing of the camera monitoring system.
Figure 3B:
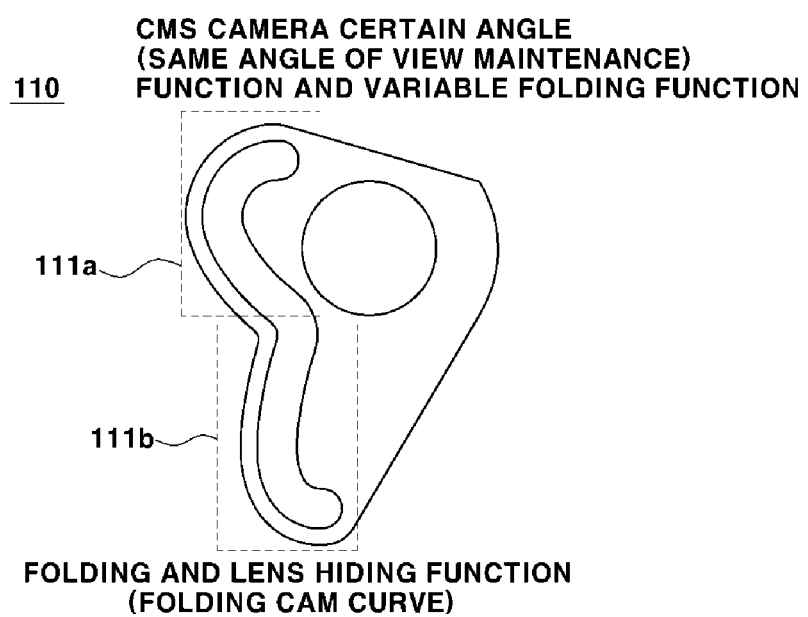
FIG. 3B is a diagram illustrating a configuration of a cam plate of the camera monitoring system.

FIGS. 3A and 3B disclose the coupling relationship between the configurations of the inside surface of the housing as one form of the present disclosure, thereby disclosing the coupling relationship between the link 120, the driving part 140, a case 141 of the driving portion 140, and the cam plate 110.

As disclosed, the housing includes the cam plate 110 including the guide part 111 to be disposed to surround the coupling shaft 160, and constitutes the link 120 having one end disposed on the guide part 111 of the cam plate 110.

The driving part 140 is configured to be disposed on the lower surfaces of the cam plate 110 and the link 120, and is configured to further include the case 141, which is configured to reduce or prevent an impact applied to the driving part 140. In addition, a region facing the link 120 on the upper surface of the case 141 is configured to include a groove 142, such that the link 120 is configured to slidably move along the guide part 111.

In another form, when moving along the guide part 111, the link 120 is configured so that a distance between the coupling shaft 160 and one end of the link 120 varies.

In summary, the cam plate 110 is configured to be integrally fastened to the base part 200 and the housing is configured to rotate around the coupling shaft 160 fastened to the base part 200, such that the cam plate 110 is configured to be fixed to the base part 200 even when the housing rotates in the forward direction thereof.

In addition, the guide part 111 disposed on the cam plate may be divided into a first guide part 111a and a second guide part 111b, such that the first guide part 111a is configured to rotate the camera according to the rotation amount of the housing, and the second guide part 111b is configured so that a camera lens 131 rotates and moves into the housing when the camera monitoring system 100 is switched to the fully folded state (folding state).

In particular, the first guide part 111a is configured to adjust the position of the camera lens in order to have the same angle of view (e.g., maintaining the same angle of a camera view as the camera angle previously set) despite of change to a housing state (e.g., the housing is fully opened, or partially folded), thereby maintaining a stable side view while improving aerodynamic performance of the vehicle.

Therefore, the link 120 for moving along the guide part 111 disposed on the fixed cam plate 110 is configured so that the distance between the coupling shaft 160 and the link 120 varies according to the rotation amount of the housing. In addition, the link 120 is configured to correct the angle facing the camera lens 131 by interlocking with the rotation amount of the housing, such that it is configured so that the angle of view of the image photographed through the camera is constant.

The camera monitoring system 100 is configured to include a configuration of a rotating hinge part 210 between the housing and the base part 200, such that when the camera monitoring system 100 rotates in the forward direction thereof, configurations excluding the cam plate 110 are configured to move along the rotating hinge part 210, and when the camera monitoring system 100 rotates in the reverse direction thereof, all the configurations including the cam plate 110 are configured to rotate and move in the reverse direction along the rotating hinge part 210.

That is, when the housing rotates in the forward direction thereof, the position of the cam plate 110 fastened to the base part 200 is configured to be fixed, and when the housing rotates in the reverse direction thereof, not only the housing but also the cam plate 110 fastened to the base part 200 are configured to be rotated in the reverse direction thereof. As described above, the rotating hinge part 210 is configured so that the housing is rotated independently of the cam plate 110 upon rotating in the forward direction thereof, and the housing and the cam plate 110 are configured to simultaneously rotate upon rotating in the reverse direction thereof.

Figure 4:
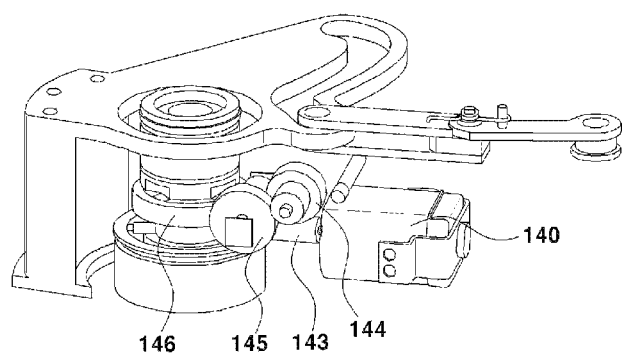
FIG. 4 is a diagram illustrating the coupling of a driving part to which a driving force of the camera monitoring system is applied.

FIG. 4 is a diagram illustrating a structure of transmitting a driving force in which the coupling shaft 160 is rotated through the driving part 140, as one form of the present disclosure.

The driving part 140 may be composed of an actuator motor or the like, and is configured to be disposed on the lower ends of the cam plate 110 and the link 120 to be adjacent to the coupling shaft 160. One end of the driving part 140 includes a first worm gear 143, and includes a first helical gear 144 and a second helical gear 145 configured to be connected to the first worm gear 143.

The driving force thus transmitted is finally connected to a second worm gear 146 disposed on the coupling shaft 160, and the driving force is configured to be applied to the housing fixed to and disposed on the coupling shaft 160.

Therefore, the driving force applied through the driving part 140 rotates the coupling shaft 160, and the housing fixed to the coupling shaft 160 rotates by interlocking therewith.

Figure 5A:
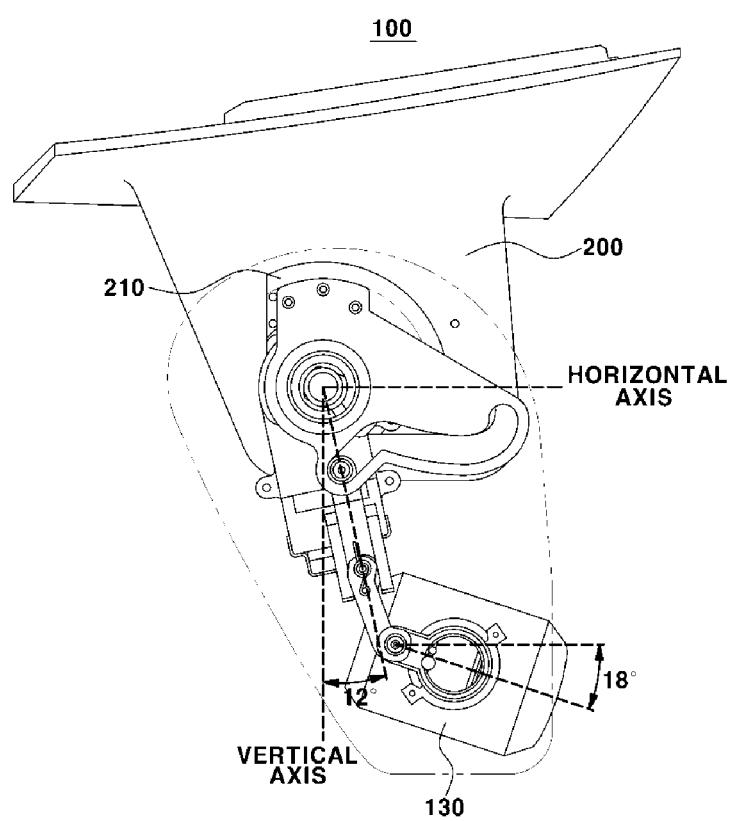
FIG. 5A is a diagram illustrating a configuration of a fully opened state of the camera monitoring system.
Figure 5B:
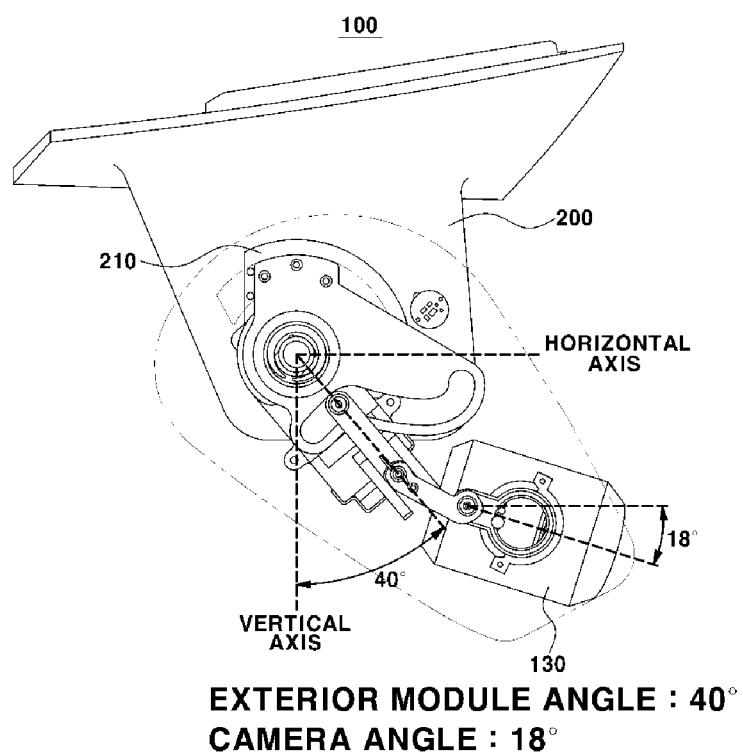
FIG. 5B is a diagram illustrating a configuration in which the camera monitoring system is in a partially folded state at a certain vehicle speed or more.
Figure 5C:
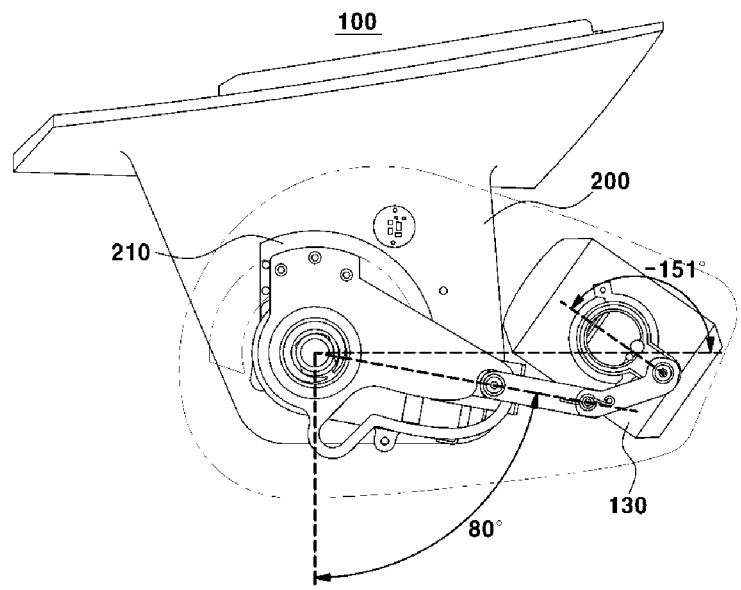
FIG. 5C is a diagram illustrating a configuration in which the camera monitoring system is in a fully folded state (folding state)

FIGS. 5A to 5C are diagrams sequentially illustrating a configuration of when the camera monitoring system 100 is in the fully opened state, the partially folded state, and the fully folded state (folding state) upon vehicle traveling, as another form of the present disclosure.

As illustrated, in FIG. 5A, the camera monitoring system 100 includes a configuration of the link 120 having a certain angle toward the rear of the vehicle with respect to the vertical axis thereof in the fully opened state. In addition, the camera disposed at the end of the link 120 is configured to have a predetermined angle with respect to the horizontal axis thereof in a direction away from the vehicle.

In another form of the disclosed present disclosure, an angle of the link 120 with respect to the vertical axis thereof is configured to have 12° degrees, and the camera lens 131 is configured to have an angle of 18° degrees with respect to the horizontal axis thereof.

FIG. 5B is diagram illustrating the camera monitoring system 100 configured in the partially folded state when a predetermined speed or more of the vehicle speed is measured through a sensor part.

As illustrated, the angle of the link 120 with respect to the vertical axis thereof in the partially folded state is configured to be greater than the angle in the fully opened state, but the angle of the camera lens 131 with respect to the horizontal axis thereof is configured to maintain the same angle as the angle of the camera lens 131 with respect to the horizontal axis thereof in the fully opened state.

That is, in order to provide the same side surface image to a user even in case of the camera monitoring system 100 having the partially folded state or the fully opened state according to the rotation amount of the housing, the angle of the camera lens 131 with respect to the horizontal axis thereof is configured to be the same in order to maintain the same angle of view.

Therefore, the rotation of the camera lens 131 is configured to be performed simultaneously according to the rotation amount of the housing, such that the camera lens 131 is configured to have the same angle with respect to the horizontal axis thereof in the partially folded state and the fully opened state.

In FIG. 5B, the angle of the link 120 with respect to the vertical axis thereof is configured to make 40 degrees, and the angle of the camera lens 131 with respect to the horizontal axis thereof is configured to make 18 degrees.

FIG. 5C is a diagram illustrating that the camera monitoring system 100 is in the fully folded state (folding state), such that it discloses one form configured so that the angle of the link 120 with respect to the vertical axis thereof maintains 80° degrees.

In addition, one end of the link 120 is configured to be disposed at the end of the guide part 111 of the cam plate 110 so that the camera lens 131 is rotated to face the inside of the housing, such that the angle between the horizontal axis thereof and the camera lens 131 is configured to maintain −151° degrees.

As illustrated, the distance between one end of the link 120 and the coupling shaft 160 is configured to become the farthest when the camera monitoring system 100 is in the fully folded state (folding state), the link 120 is eccentrically coupled to a fixing link 132 of the camera to push one end of the camera, and the camera receiving a force pushed by the link 120 is configured to rotate and move into the housing with respect to the center axis coupled to the inside of the housing.

Therefore, the camera is configured to have an angle of −151 degrees with respect to the horizontal line thereof so that the camera lens 131 faces the inside of the housing when the camera monitoring system 100 is in the fully folded state (folding state).

Figure 6:
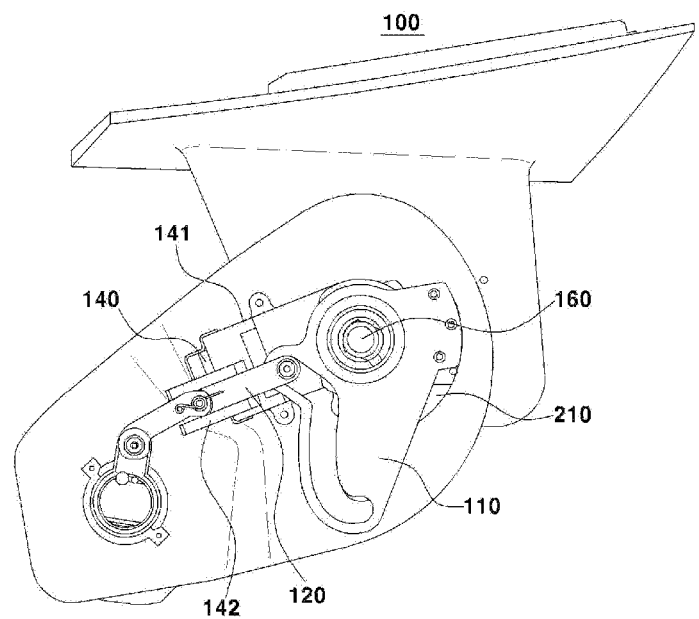
FIG. 6 is a diagram illustrating a configuration in which the camera monitoring system is in a reverse-directionally folded state.

FIG. 6 is a diagram illustrating a configuration in which the camera monitoring system 100 rotates and moves in the reverse direction thereof through the rotating hinge part 210 disposed on the base part 200, as one form of the present disclosure.

As illustrated, the camera monitoring system 100 of the present disclosure is configured to rotate in the forward direction thereof through the driving part 140, and is configured to rotate in the reverse direction thereof when an external force is applied thereto.

The rotating hinge part 210 disposed on the base part 200 is configured so that the camera monitoring system 100 excluding the cam plate 110 is rotated when the camera monitoring system 100 rotates in the forward direction thereof, and when the camera monitoring system 100 rotates in the reverse direction thereof, it is configured so that the entire camera monitoring system 100, which includes the cam plate 110 part fixed to and disposed on the base part 200, rotates.

That is, the rotating hinge part 210 is composed of two stages, and a first stage is configured to include the coupling shaft 160 and thereby, is configured so that the housing rotating in the forward direction thereof and the coupling shaft 160 are simultaneously rotated when the driving force is applied thereto, and the cam plate 110 part is coupled to a second stage and thereby, is configured so that the entire camera monitoring system 100 may be rotated in the reverse direction thereof with respect to the base part 200.

In addition, the second stage of the rotating hinge part 210 is configured to include a stopping projection thereon, such that the camera monitoring system 100 is configured to rotate in the reverse direction thereof only when an external force of a certain value or more is applied to the camera monitoring system 100.

Figure 7:
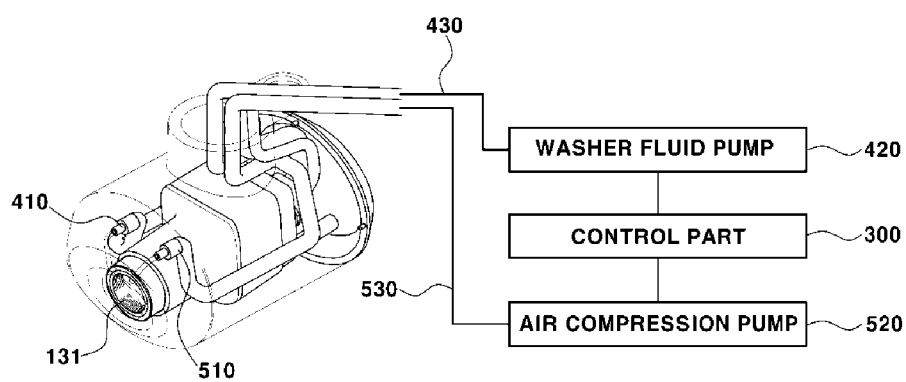
FIG. 7 is a diagram illustrating the coupling between the configurations into which washer fluid and air of the camera monitoring system are injected.
Figure 8:
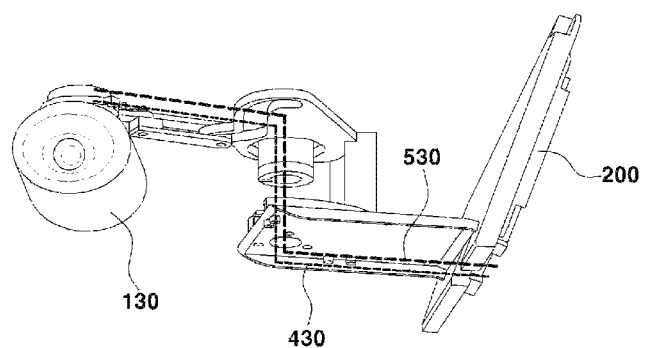
FIG. 8 is a diagram illustrating a configuration of the passages into which the washer fluid and the air of the camera monitoring system are injected.

FIGS. 7 and 8 are diagrams illustrating a cleaning structure for preventing contaminations of the camera monitoring system 100 of the present disclosure.

As a configuration of the present disclosure disclosed in FIG. 7, a cleaning structure includes an air nozzle 510 and a washer fluid nozzle 410 disposed to face the camera lens 131. The washer fluid nozzle 410 is configured to be fluidly coupled to a washer fluid pump 420 disposed on one end thereof along a washer fluid passage 430, and the air nozzle 510 is configured to be fluidly connected to an air compression pump 520 along an air passage 530.

The control part 300 of the present disclosure is configured to drive the washer fluid pump 420 and the air compression pump 520 disposed in the vehicle body 600 or on the camera monitoring system 100 according to a user's request to discharge washer fluid and air with the washer fluid nozzle 410 and the air nozzle 510 disposed adjacent to the camera lens 131. In addition, the control part 300 of the present disclosure may be configured to control the injected amounts of the washer fluid and the air according to the user's request or the degree of contamination measurement of the camera lens 131.

In addition, the control part 300 may inject the air to remove raindrops present on the camera lens 131 through the air nozzle 510 according to the amount of precipitation measured from a rain sensor.

In one form of the present disclosure, as illustrated in FIG. 8, the washer fluid nozzle 410 and the air nozzle 510 are fluidly connected to the washer fluid pump 420 and the air compression pump 520, respectively, such that the passages are configured to be extended to the coupling shaft 160 along the upper end of the link 120, and are configured to be disposed in the vertical direction thereof along the coupling shaft 160 to be connected to the inside of the vehicle body 600 along the base part 200.

That is, the air compression pump 520 and the washer fluid pump 420 may be configured to be disposed in the vehicle body 600, and is configured to be fluidly connected to the washer fluid nozzle 410 and the air nozzle 510 configured at the positions adjacent to the camera lens 131 along the passages.

The foregoing detailed description illustrates the present disclosure. In addition, the above description is intended to illustrate and explain the exemplary forms of the present disclosure, and the present disclosure may be used in various other combinations, modifications, and environments. That is, changes or modifications thereof may be made within the scope of the concept of the disclosure disclosed in the present specification, the scope equivalent to the described disclosure and/or the scope of the technology or knowledge of the art. The described forms are intended to explain the best mode for implementing the technical spirit of the present disclosure, and various changes desired in the specific applications and usages of the present disclosure may also be made. Therefore, as described above, the detailed description of the disclosure is not intended to limit the present disclosure to the disclosed forms.

What is claimed is:

1. A camera monitoring system, comprising:
   a housing configured to rotate around a coupling shaft of a base part disposed in a vehicle;
   a camera disposed on one end of the housing;
   a rotating hinge part configured at a position facing the housing on the base part;
   a cam plate disposed inside the housing, and positioned on the rotating hinge part;
   a link including a first end configured to move along a guide part of the cam plate, and a second end configured to rotate the camera when the housing rotates;
   a driving part configured to apply a driving force so that the housing rotates; and
   a control part configured to:
      determine a folded state of the housing by controlling the driving force applied from the driving part based on a vehicle speed, and
      rotate the camera simultaneously with the housing based on the folded state of the housing so as to maintain a previously set angle of a camera view,
   wherein the housing and the cam plate are rotatable in a reverse direction when the camera monitoring system is moved beyond a fully open state.

2. The camera monitoring system of claim 1, wherein the guide part disposed on the cam plate comprises:
   a first guide part configured so that the camera is rotated based on a rotation amount of the housing; and
   a second guide part configured so that a camera lens rotates and moves into the housing when the housing has been folded.

3. The camera monitoring system of claim 1,
   wherein the link is configured so that a length from the coupling shaft to the first end of the link varies when moving along the guide part.

4. The camera monitoring system of claim 3,
   wherein the link is configured to slidably move along a groove disposed on a case configured to surround the driving part.

5. The camera monitoring system of claim 1,
   wherein a part of the housing facing a driver is configured to include a mirror part.

6. The camera monitoring system of claim 1,
   wherein the control part is configured to control a rotation amount of the housing based on the vehicle speed, and to rotate the camera in order to maintain the previously set angle of the camera view based on the rotation amount of the housing.

7. The camera monitoring system of claim 1, further comprising an air injection nozzle and a washer fluid nozzle disposed adjacent to a camera lens.

8. The camera monitoring system of claim 7,
   wherein the air injection nozzle is fluidly connected to an air compression pump and the washer fluid nozzle is fluidly connected to a washer fluid pump so that injected amounts of air and washer fluid are controlled by the control part.

9. The camera monitoring system of claim 1,
   wherein the cam plate is fixed with respect to the base when the camera monitoring system rotates in a forward direction.

\* \* \* \* \*